US012054371B2

(12) United States Patent
Kritzer

(10) Patent No.: US 12,054,371 B2
(45) Date of Patent: Aug. 6, 2024

(54) SAFETY LATCHES FOR TWO POST VEHICLE LIFT

(71) Applicant: BendPak, Inc., Santa Paula, CA (US)

(72) Inventor: Jeffrey S. Kritzer, Moorpark, CA (US)

(73) Assignee: BendPak, Inc., Agoura Hills, CA (US)

(*) Notice: Subject to any disclaimer, the term of this patent is extended or adjusted under 35 U.S.C. 154(b) by 521 days.

(21) Appl. No.: 17/377,773

(22) Filed: Jul. 16, 2021

(65) Prior Publication Data

US 2022/0017342 A1 Jan. 20, 2022

Related U.S. Application Data

(60) Provisional application No. 63/053,603, filed on Jul. 18, 2020.

(51) Int. Cl.

| | |
|---|---|
| ***B66F 17/00*** | (2006.01) |
| ***B66F 3/46*** | (2006.01) |
| ***B66F 7/04*** | (2006.01) |
| ***B66F 7/28*** | (2006.01) |
| *B66F 7/20* | (2006.01) |

(52) U.S. Cl.

CPC ................ *B66F 17/00* (2013.01); *B66F 3/46* (2013.01); *B66F 7/04* (2013.01); *B66F 7/28* (2013.01); *B66F 7/20* (2013.01); *B66F 2700/123* (2013.01)

(58) Field of Classification Search

CPC .... B66F 3/30; B66F 17/00; B66F 3/46; B66F 7/04; B66F 7/28; B66F 7/20; B66F 2700/123

USPC ........................ 254/89 R; 187/208, 209, 363

See application file for complete search history.

(56) References Cited

U.S. PATENT DOCUMENTS

| | | | | |
|---|---|---|---|---|
| 2,805,839 A | | 9/1957 | Branick | |
| 2,937,002 A | | 5/1960 | Schultz | |
| 3,582,043 A | | 6/1971 | Tranchero | |
| 3,647,183 A | | 3/1972 | Rishovd | |
| 4,241,901 A | * | 12/1980 | Shircliffe .................. | B66F 7/04 254/89 H |
| 4,328,951 A | | 5/1982 | Laupper | |
| 4,531,614 A | * | 7/1985 | Naegeli ..................... | B66F 7/04 254/89 H |
| 4,856,618 A | * | 8/1989 | Isogai ....................... | B66F 7/04 187/209 |
| 5,207,296 A | * | 5/1993 | Beattie ...................... | B66F 7/04 187/210 |
| 5,339,926 A | | 8/1994 | McCanse et al. | |
| 5,489,182 A | | 2/1996 | Habicht | |
| 5,645,388 A | | 7/1997 | Lacasse | |
| 5,803,206 A | * | 9/1998 | Halstead .................. | B66F 7/04 187/359 |

(Continued)

FOREIGN PATENT DOCUMENTS

EP 566195 A1 4/1993

*Primary Examiner* — Mahdi H Nejad

(74) *Attorney, Agent, or Firm* — AVEK IP, LLC; Kent R. Erickson

(57) ABSTRACT

A safety latch mechanism for a vehicle lift includes a pawl support member secured to a support post guiding a lift carriage having vertically positioned stop blocks. A pawl plate rests on the pawl support member and is urged toward engagement with the stop blocks to arrest downward movement of the lift carriage. A release lever selectively retracts the pawl plate to release the carriage for downward movement. A cable connects between a pair of the pawl plates on a system with a pair of the lift units.

23 Claims, 14 Drawing Sheets

(56) References Cited

U.S. PATENT DOCUMENTS

| | | | | |
|---|---|---|---|---|
| 5,911,408 | A | 6/1999 | Berends et al. | |
| 5,975,495 | A * | 11/1999 | Berends | B66F 7/04<br>254/2 B |
| 6,315,079 | B1 | 11/2001 | Berends et al. | |
| 6,382,358 | B1 * | 5/2002 | Kritzer | B66F 7/04<br>187/363 |
| 6,505,815 | B1 | 1/2003 | Dellamore | |
| 6,817,449 | B2 | 11/2004 | Berends | |
| 7,334,664 | B2 | 2/2008 | Fäßler | |
| 9,656,844 | B2 * | 5/2017 | Hansen | B66F 7/02 |
| 2006/0151247 | A1 * | 7/2006 | Raffler | B66F 7/28<br>187/208 |
| 2013/0233651 | A1 * | 9/2013 | Kritzer | B66F 3/46<br>187/208 |

* cited by examiner

SAFETY LATCHES FOR TWO POST VEHICLE LIFT

CROSS-REFERENCE TO RELATED APPLICATIONS

This application claims the benefit of U.S. Provisional Patent Application No. 63/053,603, filed Jul. 18, 2020, the disclosure of which is hereby incorporated herein in its entirety by reference.

BACKGROUND OF THE INVENTION

Field of the Invention

This invention relates to automobile service lifts and, more particularly, to a safety latch arrangement for a two post lift system to prevent unintentional lowering of a lift carriage thereof.

Background & Description of Related Art

A wide variety of post-type automobile lifts have been previously known and used in the automobile repair industry and by automotive enthusiasts to provide access to the undersides of vehicles. Post lifts can be either of the in-ground or above-ground variety. In-ground post lifts usually have one or two vertically ascending columns mounted below the floor of a service facility, such as a garage, shop, or the like that are raised hydraulically to lift the vehicle. Above-ground post lifts generally have two or four vertical columns or "posts", each of which includes a carriage that rides up and down the post. Each of the carriages includes a pair of inwardly extending lift arms with vehicle engagement pads at ends thereof that engage lift points or locations on the underside of a body or frame of a vehicle to be lifted.

Each post of such a vehicle lift typically has a pair of vehicle lift arms which are formed of telescoping sections pivotally connected to the lift carriage which is selectively movable vertically on the post by a pressurized fluid cylinder connected between the lift carriage and the post, such as a hydraulic cylinder. The telescoping lift arm sections provide for a variety of lift arm lengths, and the pivotal connection of the arms to the lift carriage enables adjustment of the positions of the lift arms of the lift arrangement for use with a variety of vehicle sizes.

The lengths of the lift arms and their angular positions relative to the lift carriage is usually adjusted manually by a mechanic to position the lift pads for engagement with particular lift points of the vehicle. Once the weight of the vehicle is supported by the lift arms, friction between adjacent telescoping sections typically prevents changes in the lengths of the lift arms. However, it is generally preferred to fix the angular position of the lift arms prior to lifting.

A common lift arm angle locking mechanism includes an arcuate or curved movable or rotatable lock member mounted on an inner end of the lift arm which cooperates with a rotationally fixed position lock member mounted on the lift carriage. A typical movable lock member has circumferentially spaced teeth projecting radially outwardly about a pivot pin of the arm and has the appearance of a sector of a spur gear. The fixed lock member has an inwardly curved, toothed surface and is mounted on a lock pin. The lock pin is slidably mounted on the lift carriage and is urged by a spring toward a lowered locking position with the fixed lock engaging the movable lock. The lock pin may have a ring which is grasped by a mechanic to raise the lock pin to thereby retract the fixed lock member out of engagement with the movable lock member to enable pivoting of the lift arm. A representative type of such a vehicle lift arm locking mechanism is disclosed in U.S. Pat. No. 9,150,395, the disclosure of which is incorporated herein in its entirety by reference. A typical fixed arm lock member has a much shorter circumference than the movable arm lock member, such that pivot forces applied to the engaged lock members are concentrated in small areas of the arm lock members.

A typical telescoping lift arm has an outer arm section which is pivotally connected to the lift carriage by a pivot pin. The lift arm may include a middle arm section telescoped within the outer arm section and may also include an inner arm section telescoped within the middle arm section. For this reason, the middle and inner arm sections have progressively smaller cross-sectional dimensions than the outer arm sections and are, thus, progressively weaker to the cantilever loads the lift arm is intended to support in lifting a vehicle. Accordingly, extension of the sections of a lift arm is typically limited, as by engagement of extension stop members on the arm sections to thereby limit the cantilever load on the arm sections. Retraction of the arm sections may also be limited by engagement of respective retraction stop members. In a typical telescoping lift arm, retraction of the middle and inner sections is ultimately limited by contact of inner ends of the middle and inner arm sections with the pivot pin of the lift arm.

Once the lift carriages of a set of two post lifts have raised a vehicle, it is desirable to positively prevent the carriages from being unintentionally lowered, to avoid possible injuries and damage. For example, lift carriages that are lifted by hydraulic or pressurized air cylinders will typically stay up when valves of such cylinders are closed. However, it is considered a good practice to provide a mechanical means for latching the carriages in position which are independent of the cylinders, such as safety latches which are mechanically engaged between each carriage and the post supporting the carriage. Such safety latches must then be retracted to enable the carriages to be lowered.

Known latch arrangements have included means such as a ratchet track, with a plurality of vertically spaced latch blocks or teeth secured to the post and a ratchet pawl pivotally mounted on the lifting carriage and normally resiliently urged into engagement with the ratchet track. The ratchet latch mechanism is configured in such a manner that the pawl is pivoted out of engagement with the latch blocks by upward movement of the carriage, allowing the lifting carriage to be raised without interference by the latch mechanism. However, downward movement of the carriage causes the pawl to engage the latch blocks in such a manner as to prevent the carriage from being lowered. In order to enable lowering of the lifting carriage, the ratchet pawl must be held in a released position from the ratchet track. Automotive lifts incorporating such safety latch arrangements are disclosed in U.S. Pat. No. 6,382,358, the disclosure of which is incorporated in its entirety herein by reference, and U.S. Pat. No. 9,150,395, previously referenced.

Such a safety latch arrangement, with a ratchet track positioned on the support post and the latch mechanism positioned on the lift carriage, requires a complex mechanism to enable release of the ratchet pawl for lowering the lift carriage. In order to simplify safety latch arrangements for such types of vehicle lifts, safety latch arrangements have been devised in which the ratchet track is positioned on the lift carriage, and the safety latch mechanism is positioned on the support post. Thus, the safety latch mechanism is stationary and can be accessed and operated through an opening in a wall of the support post.

SUMMARY OF THE INVENTION

The present invention provides embodiments of a safety latch mechanism for a two post lift system for preventing unintended lowering of a vehicle supported by the lift system and for simplified release of the mechanism to enable lowering of the vehicle.

An embodiment of a two post vehicle lift system includes a pair of vehicle lift units positioned in space apart facing relation. Each lift unit includes an elongated upstanding lift post having a lift carriage slidably engaging and movable therealong. Each carriage includes a double ended lift arm supporting clevis extending inwardly of the post and having a pair of telescoping vehicle lift arms with inner or proximal arm ends thereof pivotally connected to the ends of the clevis in front-to-rear spaced relation. Each of the lift arms has telescoping arm sections, with a vehicle lift pad positioned at a distal arm end of the innermost arm section. The lift arms are telescopically extendible and retractable, and the lift arms are pivotable to enable the pads to be positioned in vertical alignment beneath lift points of a vehicle positioned between the posts of the vehicle lift system. Each post has a linear motor, such as a hydraulic cylinder, positioned therein and connected between the post and the lift carriage mounted therein. Coordinated operation of the lift cylinders enables selective raising and lowering of a vehicle supported by the lift arms of the lift units.

In an embodiment of the lift system, each lift arm includes an outer arm section, an intermediate arm section, and an inner arm section. The outer arm section is pivotally connected to an end of the clevis by a pivot member, such as a pivot pin or tube. The intermediate arm section is sleeved within the outer arm section and has a nesting slot formed at an inner end thereof which enables the intermediate arm section to be retracted such that the actual end of the intermediate arm section slides past the pivot member with the pivot member nested within the slot. The inner arm section is sleeved within the intermediate arm section and has a vehicle lift pad positioned at an outer end thereof for engagement with a lift point of a vehicle to be lifted. It is foreseen that the inner arm section could also have a nesting slot at an inner end thereof similar to the nesting slot of the intermediate arm section and for a similar purpose. The nesting slot or slots enable the lift arm to be retracted to a greater extent than would be possible without the slot or slots. The arm sections of the lift arm may have guide members to enable smooth movement of the arm sections in extending and retracting the arm sections. Additionally, stop members are preferably provided to limit outward and inward movement of the intermediate and inner arm sections.

For safe operation of the lift system, it is desirable for the angular positions of the lift arms to be lock during raising and lowering of a vehicle supported by the lift arms. In an embodiment of the system, a rotatable pivot lock member is secured to an inner end of the outer section of a lift arm and is selectively engaged by a rotationally fixed pivot lock member mounted on the clevis of the lift carriage.

The rotatable lock member may be a rotatable lock gear secured to a surface of an inner end of the outer arm section in coaxial relation to a lift arm pivot member or lift arm pivot axis about which the lift arm pivots. The rotatable lock gear rotates about the arm pivot axis as the lift arm is pivoted. The rotatable lock gear may have the form of a spur gear with rotatable lock gear teeth projecting radially from substantially an entire outer circumferential surface of the rotatable lock gear or substantially 360 degrees about the rotatable lock gear. The rotationally fixed pivot lock member may be a rotationally fixed lock gear having the form of an internally toothed ring gear with rotationally fixed gear teeth projecting radially inwardly from substantially an entire inner circumferential surface of the rotationally fixed lock gear or substantially 360 degrees about the rotationally fixed lock gear. The rotationally fixed lock gear is slidably mounted on the clevis of the lift carriage in coaxially spaced relation to the lift arm pivot axis to enable the rotationally fixed lock gear to transition between a locked or meshed position and an unlocked or unmeshed position. In the meshed position, the rotationally fixed gear teeth mesh with the rotatable gear teeth to prevent pivoting of the lift arm about the pivot axis. In the unmeshed position, the rotationally fixed gear teeth are separated from the rotatable gear teeth, thereby enabling the lift arm to pivot relative to the clevis.

The rotationally fixed lock gear may be secured to a lock guide rod or lock pin which is slidably mounted on the lift carriage clevis to enable movement between the locked and unlocked positions. A lock pin spring is engaged between the lock pin and the clevis and normally urges the lock pin toward the locked position. The lock pin is moved axially to transition the rotationally fixed lock gear to the unlocked position and released to enable the rotationally fixed lock gear to return to the locked position. In an embodiment of the lift system, a lock pin lever is engaged between the lock pin and the clevis to facilitate operation of the lock pin.

An embodiment of a safety latch mechanism for a lift unit of the lift system includes: a plurality of stops or stop blocks secured in vertically spaced relation on a surface of a lift carriage of a lift unit; a latch base plate or pawl support member secured to a post surface of a support post of a lift unit; a latch pawl or pawl plate resting on the base plate; the pawl being movable between a latch position engaging the stop blocks in such a manner as to prevent downward motion of the lift carriage and a released position out of engagement with the stop blocks, the pawl normally being urged toward the engaged position; and a release handle pivotally mounted on the support post and engaging the pawl in such a manner as to enable retraction of the pawl from the engaged position to the released position to thereby enable lowering of the lift carriage.

An embodiment of the base plate has an upper support surface while the pawl has a lower end engaging the upper support surface and an upper end block surface opposite the lower end. In the engaged position of the pawl, the upper block surface engages the lower stop surface of a stop block whereby the pawl is wedged between the stop block and the base plate to thereby prevent downward motion of the lift carriage. In the released position, the upper block surface of the pawl is retracted from engagement with the lower stop surface of the stop block, thereby enabling the stop block to lower past the latch mechanism.

In embodiments of the safety latch mechanism, the lower stop surface of each stop block is also oriented horizontally. The upper support surface of the base plate is oriented horizontally. The pawl has an outer face toward the support post, an inner face toward the lift carriage, a lower end surface oriented at an acute angle relative to the outer face, and an upper end block surface oriented at an acute angle relative to the inner face. The faces and end surfaces of the pawl are configured in such a manner that the upper block surface and the lower end surface thereof are both oriented horizontally when the pawl is in the engaged position.

The pawl may be resiliently urged toward the engaged position by a spring engaged between the base plate and the pawl, by gravity, or by a combination of such a spring and gravity. During upward movement of the lift carriage, the stop blocks freely urge the pawl out of the engaged position, such that the pawl does not interfere with upward movement of the lift carriage. The safety latch mechanism may include a guide member secured to the post and extending through the pawl to guide movement of the pawl between the engaged position and the released position. The guide member may also limit the degree of movement toward the lift carriage.

In an embodiment of the safety latch mechanism, the release handle is pivotally connected to a wall of the support post and is connected to the pawl by a release link. In a two post lift system, a safety latch mechanism according to the present invention is provided on each post, and operation of such mechanisms is coordinated, as is operation of lift cylinders of the two posts. In an embodiment of the safety latch mechanism, a release cable is connected to the release handle on one side of the lift system and is routed over sheaves or pulleys to the opposite post and connected to the pawl of the opposite side latch mechanism. The cable enables the pawl s of both posts to move substantially simultaneously between the engaged positions and the released positions thereof.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENTS

Figure 1:
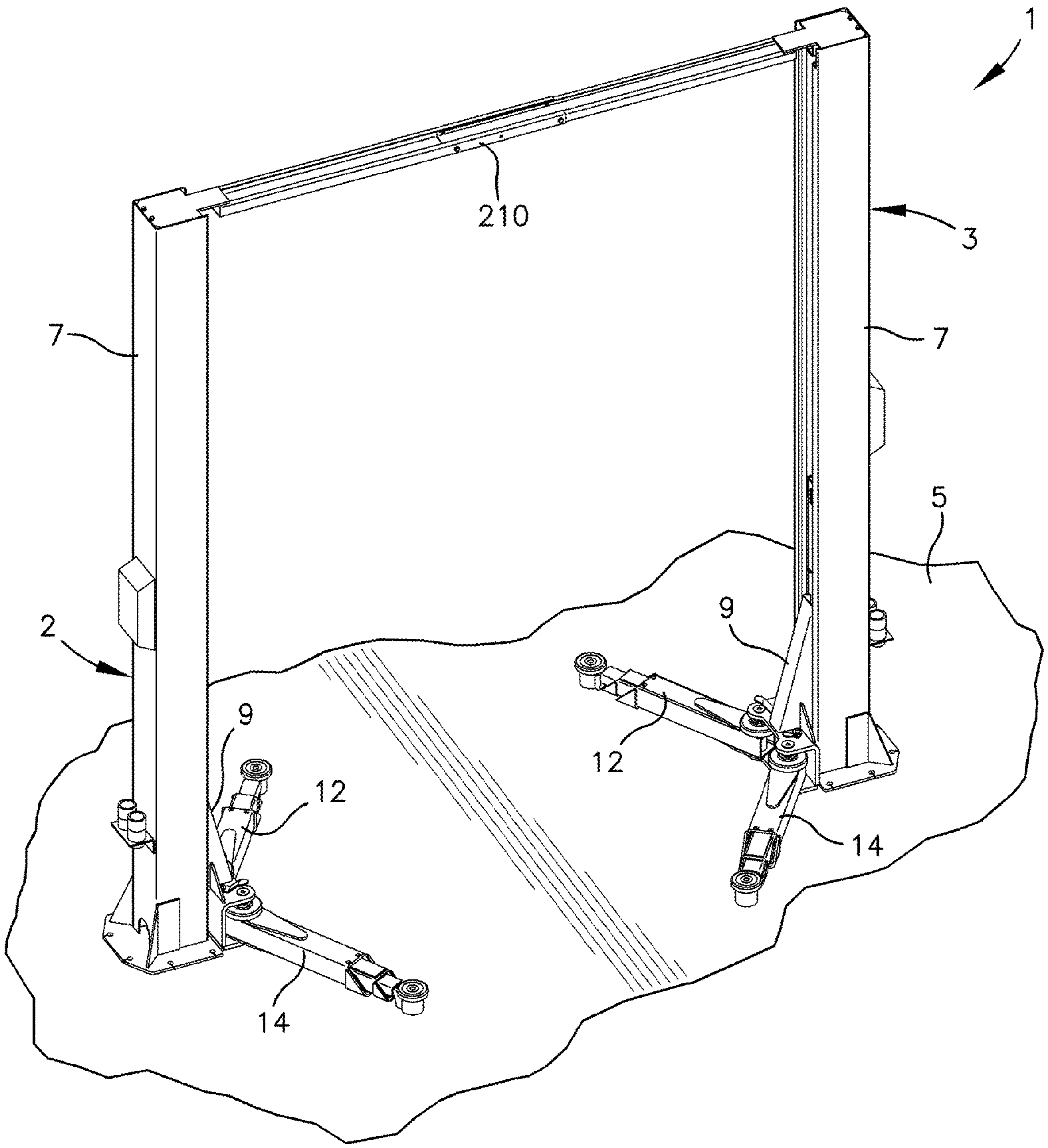
FIG. 1 is a perspective view of an embodiment of a two post vehicle lift system with compactly telescoping arms, according to the present invention.
Figure 2:
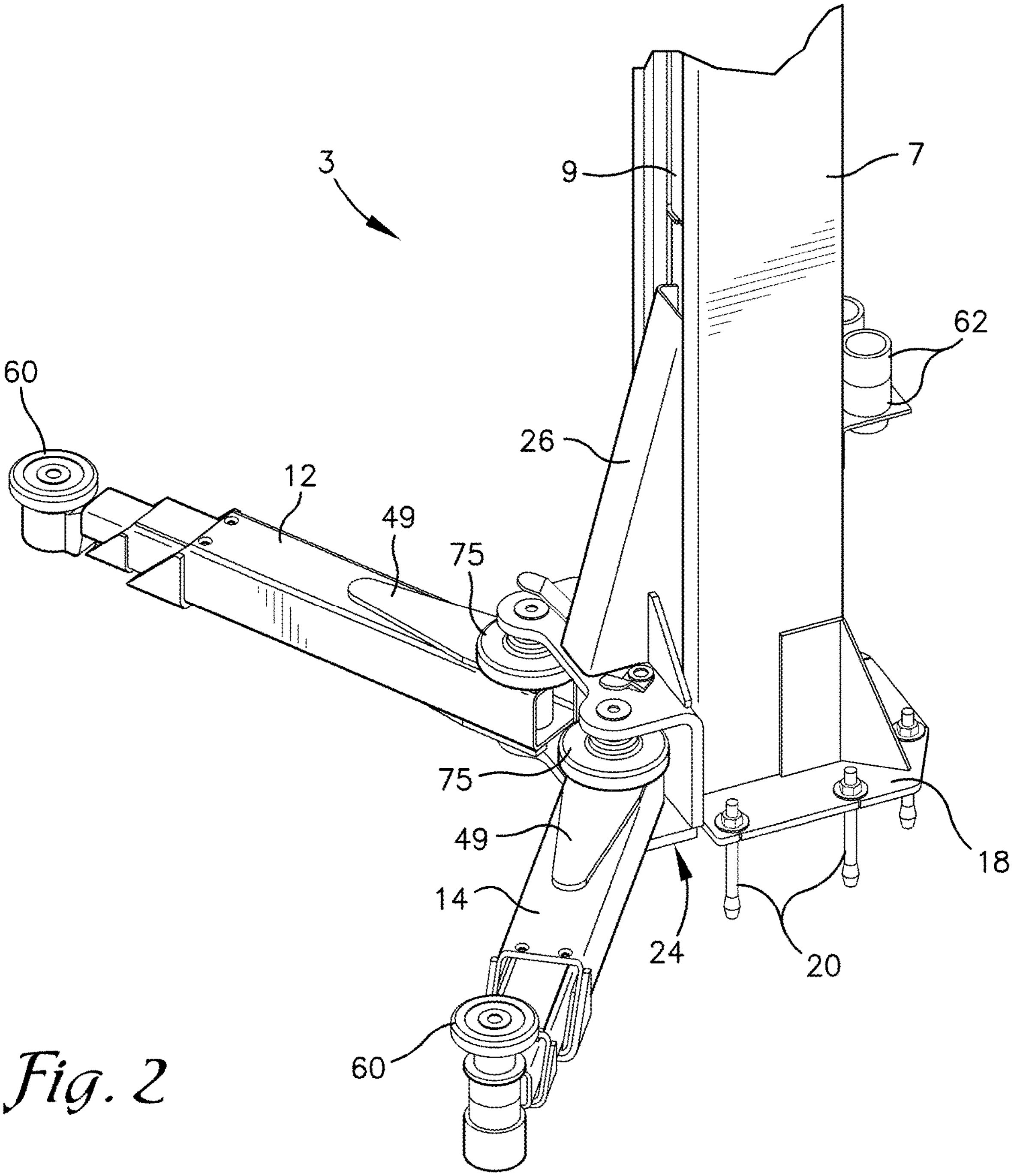
FIG. 2 is an enlarged fragmentary perspective view of a lift unit of the lift system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure Referring to the drawings in more detail, the reference number 1 generally designates an embodiment of a two post vehicle lift system according to the present invention. Referring to FIG. 1, the system 1 generally includes a pair of vehicle lift units 2 and 3 positioned in mutually facing relation on a floor 5 of a vehicle service facility, such as a garage, shop, or the like. Each of the lift units 2 and 3 includes an elongated upstanding post 7 having a vehicle lift carriage 9 slidably mounted thereon to enable lifting and lowering of a vehicle, for inspection, service, or the like. Each of the lift carriages 9 has a pair of telescoping vehicle lift arms 12 and 14 pivotally mounted thereon to enable positioning for engagement with a vehicle to be lifted.

Referring to FIGS. 2-5, the illustrated post 7 is supported on a base plate 18 which is secured to the shop floor 5 by a plurality of bolts 20 spaced about a periphery of the base plate 18. The lift carriage 9 is illustrated as an elongated tubular structure which is slidably mounted within the post 7. The carriage 9 is translated vertically along the post 7 by operation of a linear motor, such as a hydraulic lift cylinder 22 (FIG. 3) connected between the post 7 and the carriage 9. The carriage 9 has a double ended lift arm support clevis 24 secured thereto at a lower end thereof and reinforced by a center gusset member 26 and end gussets 27. The clevis 24 may be formed by a clevis bottom plate 30 (FIG. 5) having an inverted L-shaped clevis bracket 32 joined thereto to form a generally C-shaped structure. The illustrated clevis bracket 32 has a vertical clevis side plate 33 and a horizontal clevis top plate 34. The illustrated clevis 24 has openings in the top plate 34 and bottom plate 30 to receive vertically oriented lift arm pivot pins 38 (FIG. 5) on which the lift arms 12 and 14 pivot.

The lift units 2 and 3 are substantially similar and may be designated as a left hand lift unit 2 and a right hand unit 3. The lift arms 12 and 14 may be substantially similar in construction and operation and may be designated as a rear lift arm 12 and a front lift arm 14. Thus, description of components and interaction thereof for the rear lift arm 12 corresponds to similar components of the front lift arm 14. In the lift unit 3, as illustrated particularly in FIG. 3, the front lift arm 14 is somewhat shorter than the rear lift arm 12. The purpose for the difference in the length of the lift arms 12 and 14 is to better balance the weight of modern vehicles on the lift system 1. Modern vehicles, particularly passenger vehicles, tend to be heavier in front because of the location of the transmission and transaxle, as wells as the engine, toward the front of the vehicle. Thus, the shorter front lift arms 14 position the front end of a vehicle closer the posts 7. It is foreseen that the lift arms 12 and 14 could alternatively be of equal lengths.

Figure 6:
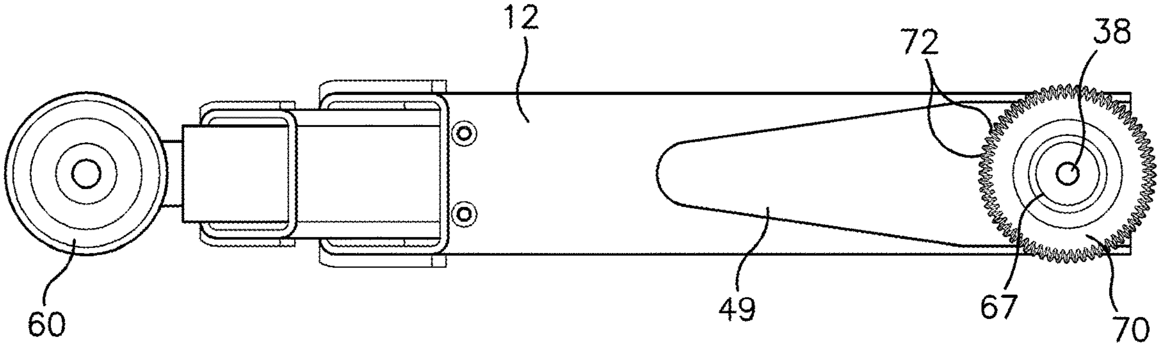
FIG. 6 is a further enlarged top plan view of a lift arm of the lift unit, with a portion removed to illustrate details thereof.
Figure 7:
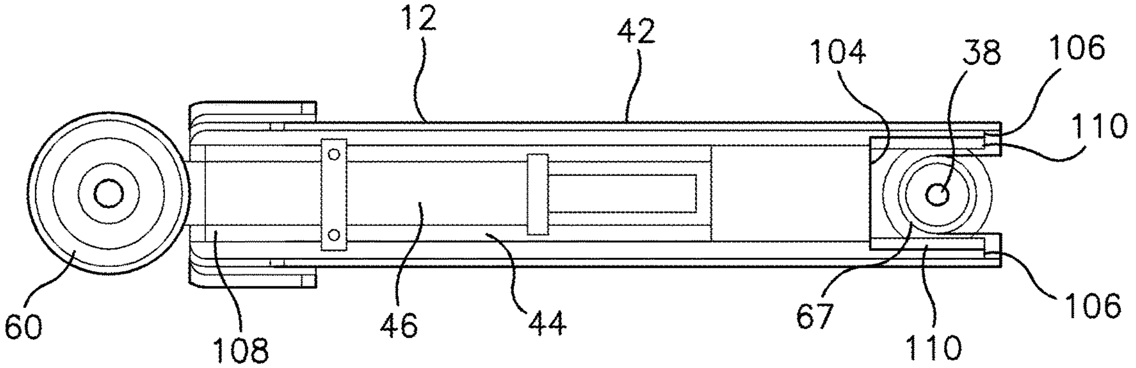
FIG. 7 is an enlarged fragmentary top plan view of a lift arm of the lift unit with an upper wall of an external arm section removed to illustrate a nesting slot formed at an inner or proximal end of a middle arm section in relation to a mounting tube of the lift arm.

Referring to FIGS. 6 and 7, the illustrated telescoping lift arm 12 includes an outer lift arm section 42, an intermediate or middle lift arm section 44, and an inner lift arm section 46. The middle arm section 44 is sleeved within the outer arm section 42, and the inner arm section 46 is sleeved within the middle arm section 44. The lift arm sections 42-46 may be formed of lengths of rectangular or square cross section tubular beams of appropriate sizes or may built up from components such as channels, plates, and the like which are joined, as by welding. The outer arm section 42 may be reinforced by an upper stiffener 49 and a lower stiffener 50 (FIGS. 10 and 11) joined respectively to an upper surface and a lower surface of the outer arm section 42.

Figure 10:
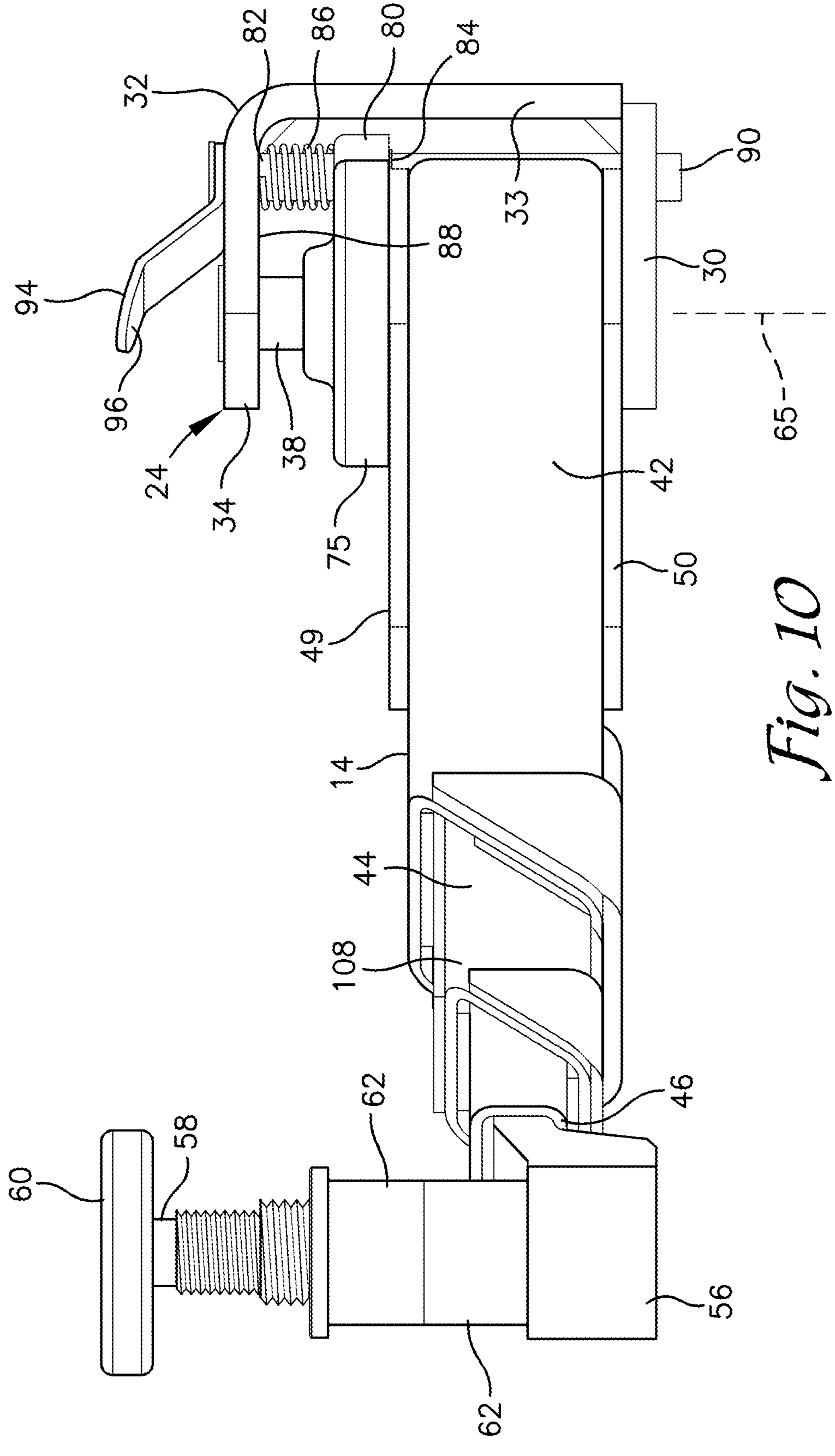
FIG. 10 is a further enlarged front elevational view of a retracted front lift arm and illustrates the rotationally fixed arm lock gear in a lowered arm locking, meshed position.
Figure 11:
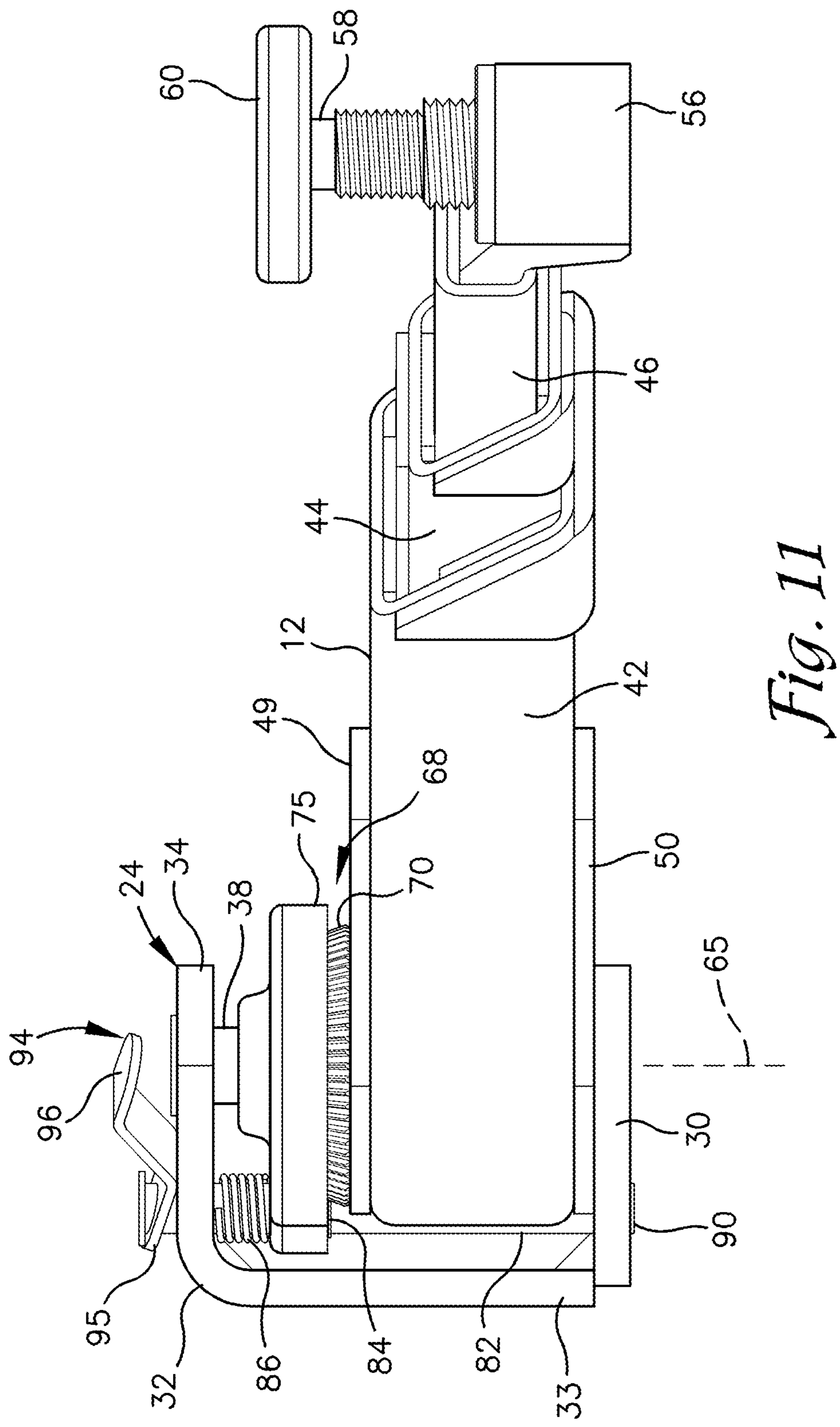
FIG. 11 is a rear elevational view of a retracted rear lift arm and illustrates the rotationally fixed arm lock gear in a raised arm unlocking, unmeshed position.

Referring to FIGS. 10 and 11, an outer end of the inner arm section 46 is provided with a lift pad adapter 56 configured to receive a lift pad assembly 58 having a lift pad 60 positioned at a top end thereof. The lift pad assembly 58 may include one or more extensions 62 (FIG. 10) to position the lift pad 60 at a desired height. The lift pad 60 forms a contact element between the lift arm 12 and a lift point of a vehicle to be lifted.

The lift arm 12 is pivotally connected to the lift arm clevis 24 for pivoting about a vertical lift arm pivot axis 65 (FIGS. 10 and 11). In the illustrated arm 12, a lift arm mounting tube or bushing 67 (FIGS. 6 and 7) extends through the upper and lower walls of the outer arm section 42 and through the upper and lower stiffeners 49 and 50 and is joined to those elements, as by welding. The mounting tube 67 is sleeved onto the lift arm pivot pin 38, which is secured in a vertical orientation within the clevis 24 and, in cooperation with the pivot pin 38, forms a pivotal bearing for the lift arm 12 relative to the clevis 24.

Figure 8:
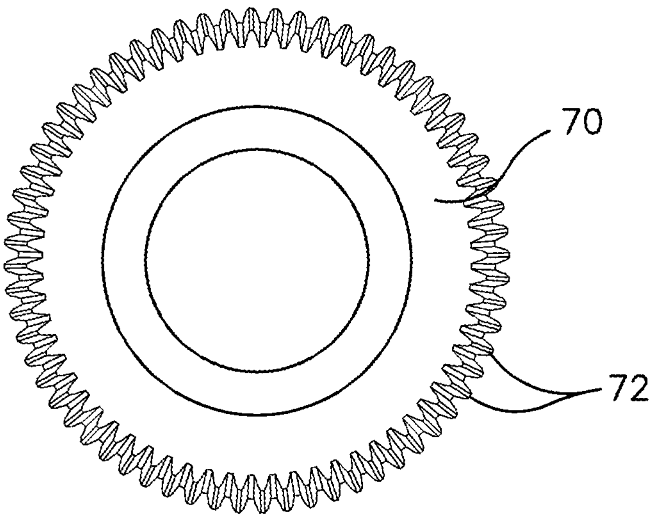
FIG. 8 is a greatly enlarged top plan view of a rotatable arm lock gear of a lift arm of the lift unit.
Figure 9:
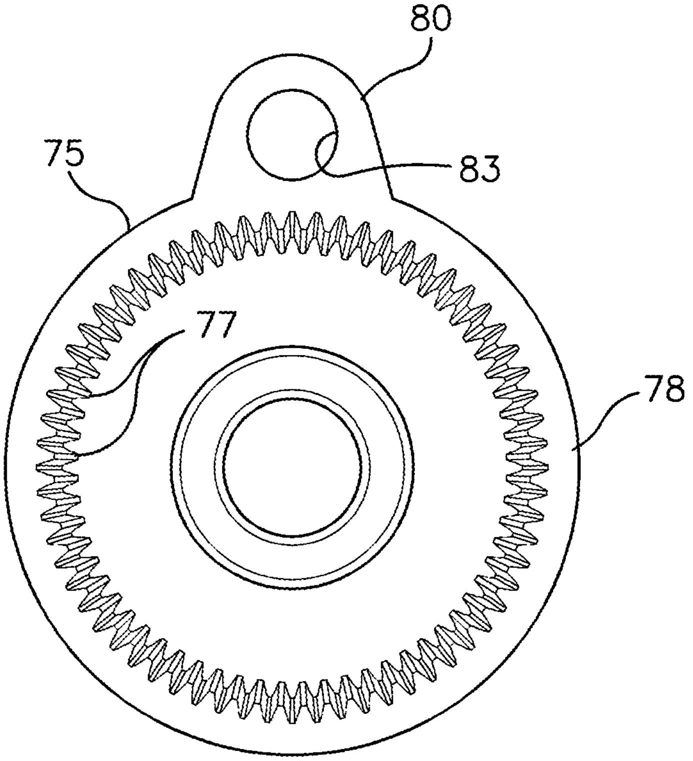
FIG. 9 is a greatly enlarged bottom plan view of a rotationally fixed arm lock gear of a lift arm of the lift unit.

It is generally desirable to positively fix the angular position of the lift arms 12 and 14, especially, prior to lifting a vehicle. The illustrated lift arms 12 and 14 include a lift arm rotational lock mechanism 68 (FIG. 11) to enable releasably fixing the angular relation of the arms 12 and 14 to the clevis 24 of the lift carriage 9. In the illustrated system 1, the arm lock mechanism 68 of each of the lift arms 12 or 14 includes a rotatable lift arm pivot lock member or gear 70 secured to the outer arm section 42 in coaxially aligned relation to the mounting tube 67 and, thus, with the pivot pin 38 and the pivot axis 65. As shown in FIG. 11, the rotatable lock gear 70 may be secured to the upper arm stiffener 49 of the outer arm section 42 and rotates about the pivot axis 65 as the lift arm 12 or 14 is pivoted about the pivot axis 65. As shown in FIGS. 8 and 11, the rotatable gear 70 has the form of a circular spur gear with rotatable gear teeth 72 projecting radially therefrom and spaced circumferentially about substantially an entire outer surface of the gear 70 or substantially 360 degrees about the rotatable lock gear 70. Additionally, in the illustrated rotatable gear 70, bottom and top lands of the gear teeth 72 have a conical relationship to an axis of the rotatable lock gear 70.

Figure 12A:
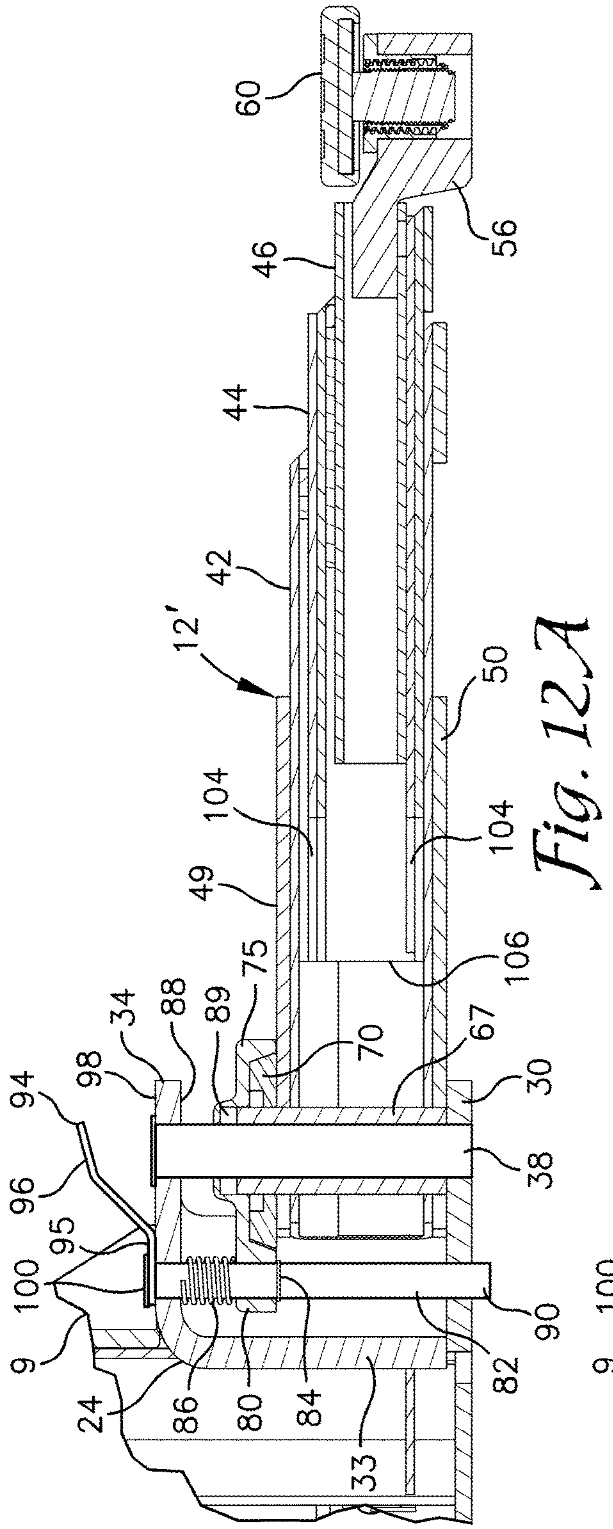
FIG. 12A is an enlarged fragmentary cross-sectional view through a somewhat modified lift arm, taken along a section plane indicated by line 12-12 of FIG. 3, and shows the release lever, lock pin, and rotationally fixed arm lock gear in the lowered arm locking, meshed positions thereof.
Figure 12B:
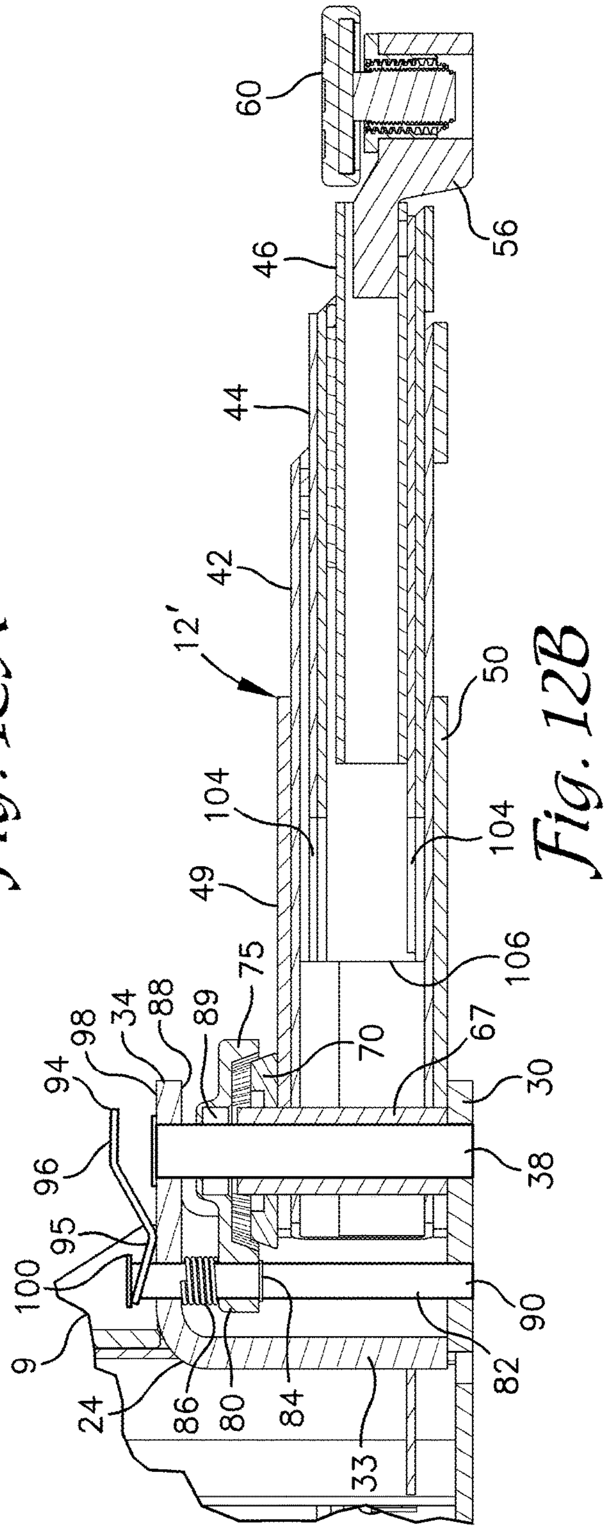
FIG. 12B is a view similar to FIG. 12A and shows the release lever, lock pin, and rotationally fixed arm lock member in the raised arm unlocking, unmeshed positions thereof.

FIGS. 12A and 12B illustrate a lift arm 12' which is somewhat modified in construction compared to the lift arms 12 and 14. The lift arm 12' is structurally and functionally similar to the lift arms 12 and 14, and corresponding components thereof will be identified by the same reference numerals as components of the lift arms 12 and 14.

Referring to FIGS. 9 and 11-12B, the arm lock mechanism 68 of the arms 12 and 14 includes a rotationally fixed lift arm pivot lock member or gear 75, illustrated as slidably received on the pivot pin 38 in covering relation to the rotatable lock gear 70 and rotationally fixed by connection to the carriage clevis 24. The rotationally fixed gear 75 is illustrated as an internal ring gear having a plurality of radially inwardly projecting rotationally fixed teeth 77 from substantially an entire inner surface of an outer circumferential flange 78 of the gear 75 or substantially 360 degrees about the rotationally fixed gear 75. Bottom and top lands of the gear teeth 77 have a conical relationship to an axis of the rotationally fixed gear 75 and are sized to compatibly mesh with the gear teeth 72 of the rotatable gear 70.

The illustrated rotationally fixed gear 75 has a rotationally fixed lock gear mounting lug 80 extending radially therefrom. The mounting lug 80 is slidably received onto a lock guide rod or lock pin 82 extending through a bore 83 formed through the lug 80. The lock pin 82 is mounted on the clevis 24 for vertical reciprocating movement in relation thereto. Both the pivot pin 38 and the lock pin 82 are mounted on the clevis 24 such that lateral movement of both is prevented. Thus, rotation of the rotationally fixed gear 75 is prevented by its mounting on the pivot pin 38 and the lock pin 82. However, the rotationally fixed gear 75 is free to move axially along the pivot pin 38. Relative movement of the mounting lug 80 and the gear 75 on the lock pin 82 is limited by means such as a snap ring 84 positioned below the lug 80 on the lock pin 82. A compression spring 86 is sleeved onto the lock pin 82 between the mounting lug 80 and a bottom surface 88 of the clevis top plate 34. Engagement of the spring 86 with the bottom surface 88 of the clevis top plate 34 resiliently urges the lock pin 82 downwardly.

The lock pin 82 is movable vertically between a lower pivot lock position (FIGS. 10 and 12A) and a raised pivot release position (FIGS. 11 and 12B). In the lock position of the lock pin 82, the rotationally fixed lock gear 75 is meshed with the rotatable lock gear 70, preventing rotation thereof, to thereby prevent angular movement of the lift arm 12 or 14 or 12' relative to the clevis 24. As shown in FIGS. 12A and 12B, the rotationally fixed gear 75 may have an annular recess 89 on an underside thereof to enable the gear 75 to extend over and about an upper end of the mounting tube 67 in the locked position of the gear 75. In the release position of the lock pin 82, the rotationally fixed gear 75 is lifted out of meshing relation with the rotatable gear 70, thereby enabling rotation thereof, to thereby enable the lift arm 12 or 14 or 12' to pivot about the associated pivot pin 38. It should be noted that the lock pin 82 has a lower end 90 which extends below a lower surface of the bottom plate 30 of the clevis 24, such that when the lift carriage 9 is lowered to the shop floor 5, contact of the lock pin lower end 90 with the floor 5 causes the lock pin 82 to lift the rotationally fixed gear 75 out of meshed engagement with the rotatable gear 70, thereby releasing the lift arm 12 or 14 or 12' to freely pivot about the pivot pins 38.

In order to facilitate movement of the lock pin 82 to the release position, the illustrated lift system 1 is provided with a release handle or lever 94 engaged with the lock pin 82 and operable to lift the lock pin 82 to the release position (FIG. 11). The illustrated release lever 94 is of a stretched Z-shape having a lower flat end 95 and an upper flat end 96. The lower end is 95 retained on the lock pin 82 between an upper surface 98 of the top plate 34 of the clevis 24 and a top end washer 100 fixed to a top end of the lock pin 82. Downward pressure on the upper end 96 of the release lever 94 causes the lower end 95 thereof to engage the washer 100 to thereby lift the lock pin 82 from its lower lock position to its upper release position, to thereby lift the rotationally fixed gear 75 out meshing engagement with the movable gear 70 to enable the lift arm 12 or 14 or 12' to be pivoted about the associated lift arm pivot axis 65. When the upper end 96 of the lever 95 is released, the compression spring 86 and gravity return the lock pin 82 to the lock position with the rotationally fixed gear 75 enmeshed with the movable gear 70, thereby preventing pivoting of the lift arm 12 or 14 or 12' relative to the clevis 24.

The lift arm sections 42-46 may include guide members (not shown) to facilitate smooth extension and retraction of the middle and inner arm sections 44 and 46 relative to the outer arm section 42 and therebetween. It is necessary to limit the degree of extension of the middle and inner lift arm sections 44 and 46 from the outer lift arm section 42 to avoid exceeding cantilever loading limits of the arm sections 42-46. Therefore, the middle and inner arm sections 44 and 46 preferably include appropriate stops (not shown) to limit extension of the lift arm 12 or 14 or 12'. On the other hand, it is preferable to retract the middle and inner arm sections 44 and 46, as far as is practical, so that the lift arm assemblies 12 or 14 or 12' is as compact as possible when retracted. Usually, the limit of retraction of the arm sections 44 and 46 is engagement of inner ends thereof with the pivot members of the lift arm 12 or 14 or 12'.

Referring to FIGS. 7, 12A, and 12B, in the illustrated embodiment of the vehicle system 1, the middle lift arm section 44 has a pivot tube nesting recess or slot 104 formed at an inner end 106 thereof which enables inner end 106 of the middle arm section 44 to be retracted past the mounting tube 67, with the mounting tube 67 positioned in, or nesting within, the slot 104. The presence of the nesting slot 104 allows the middle arm 44 to be somewhat longer than otherwise possible while enabling an outer end 108 to be retracted to the same degree as a shorter middle arm section 44 without the slot 104. It is foreseen that an inner end of the inner arm section 46 could also be provided with a nesting slot similar to the nesting slot 104 for the same purpose, that is, to enable more compact retraction of the inner arm section 46 within the middle arm section 44. FIG. 7 shows horizontally spaced apart guide plates 110 positioned on opposite sides within the outer arm section 42 to form guides for the ends 106 of the middle arm section 44. The lift arm 12 or 14 or 12' may be provided with appropriate stops (not shown) which limit retraction of the middle and inner arm sections 42 and 44 so that inner ends thereof do no contact the pivot tube 67.

While the lift units 2 and 3 are described and illustrated as being permanently mounted on a shop floor 5, it is foreseen that features of the system 1 of the present invention described herein could be advantageously incorporated into mobile lift units which are temporarily secured in place in the manner of the lifts shown in U.S. Pat. No. 9,150,395, referenced above.

FIGS. 13-18 illustrate details of a safety latch mechanism 150 for a two post vehicle lift system, such as the system 1 described and illustrated above. When the lift cylinders 22 have lifted the lift carriages 9 to a desired height, valves (not shown) of the cylinders will be closed, which will prevent fluid therein from exiting therefrom. Thus, under normal circumstances, the cylinders 22 with valves closed will support the weight of the lift carriages 9 and a vehicle positioned thereon. However, it is desirable to positively prevent the loaded carriages 9 from unintended descent, such as by failure of valves of the cylinders 22 or by accidently bumping a hydraulic control (not shown) of the cylinders 22, by means independent of the cylinders 22 and controls thereof. The present invention provides the safety latch mechanism 150 to limit unintended descent of the lift carriages 9.

Figure 3:
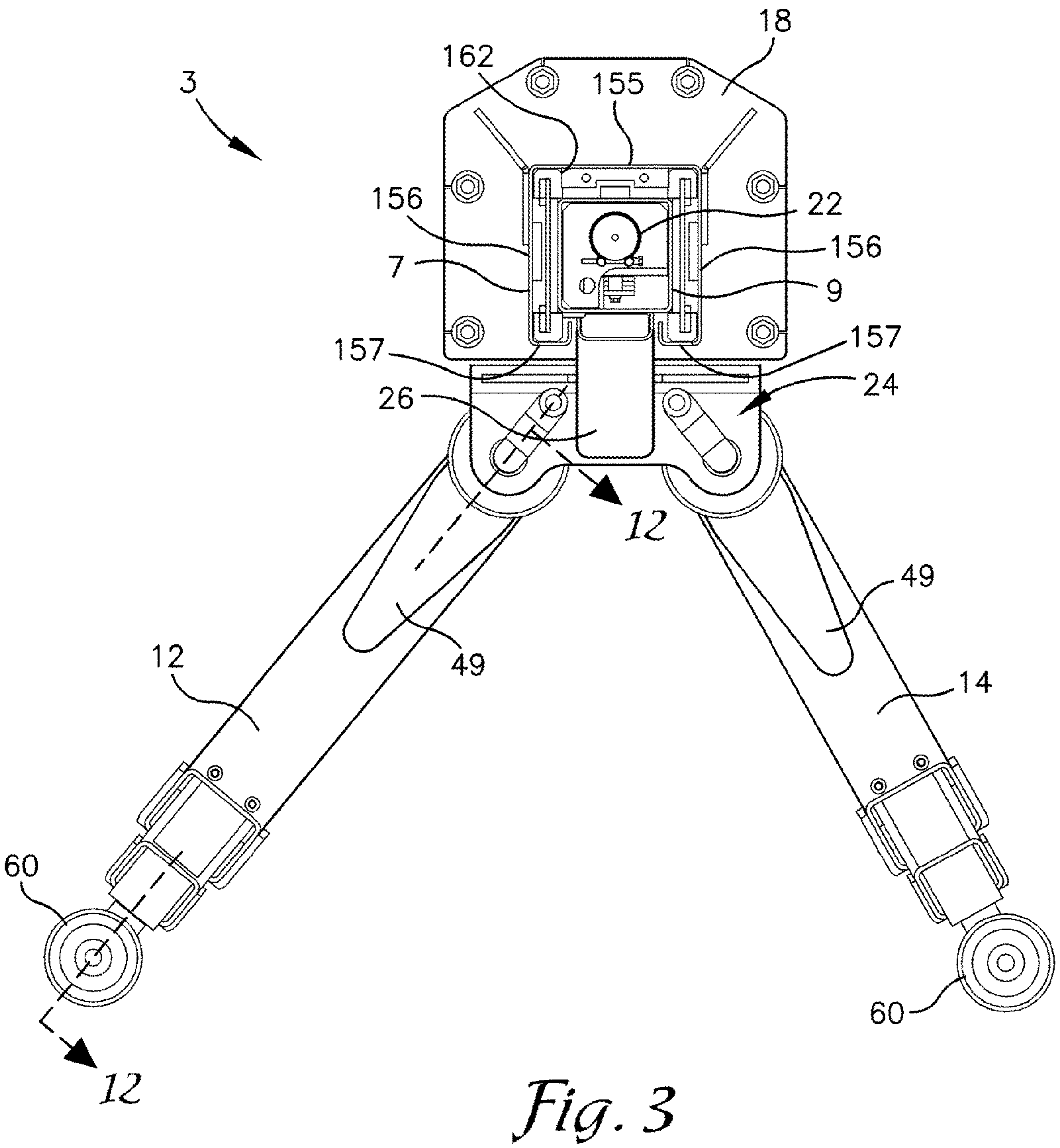
FIG. 3 is a top plan view of a lift unit of the lift system.
Figure 4:
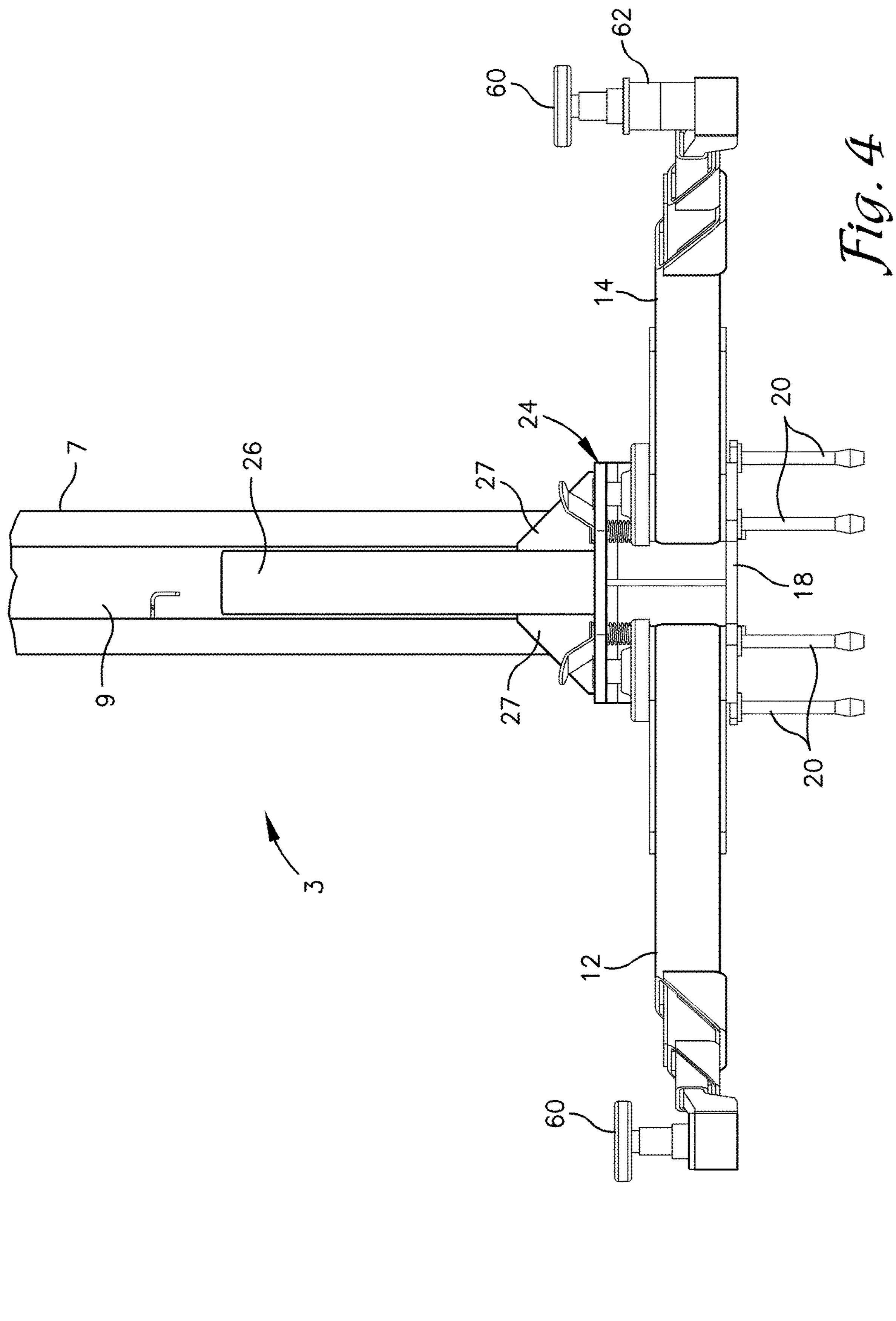
FIG. 4 is a further enlarged fragmentary inside elevational view of the lift unit of the lift system.
Figure 5:
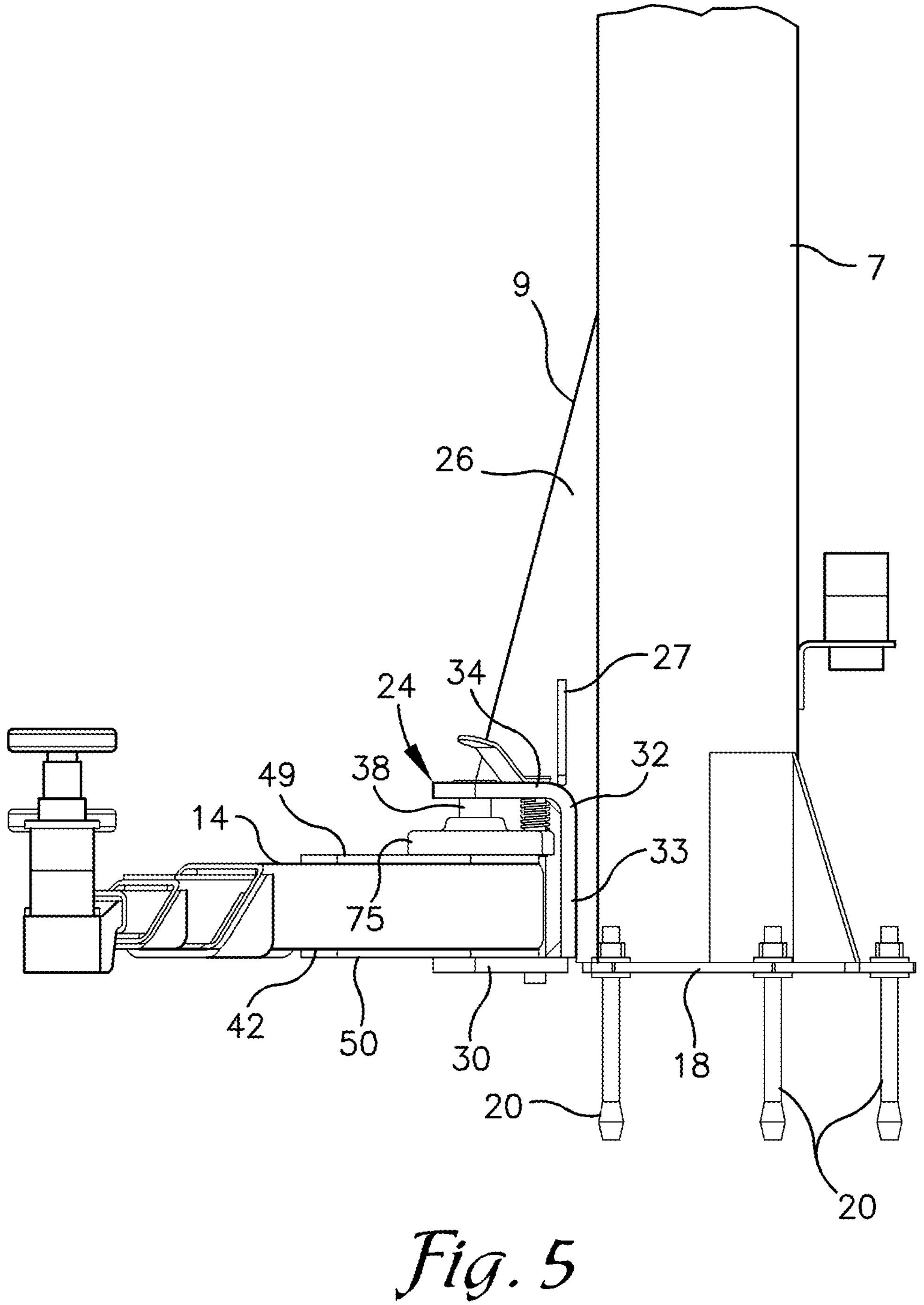
FIG. 5 is a further enlarged front side elevational view of the lift unit of the lift system.
Figure 13:
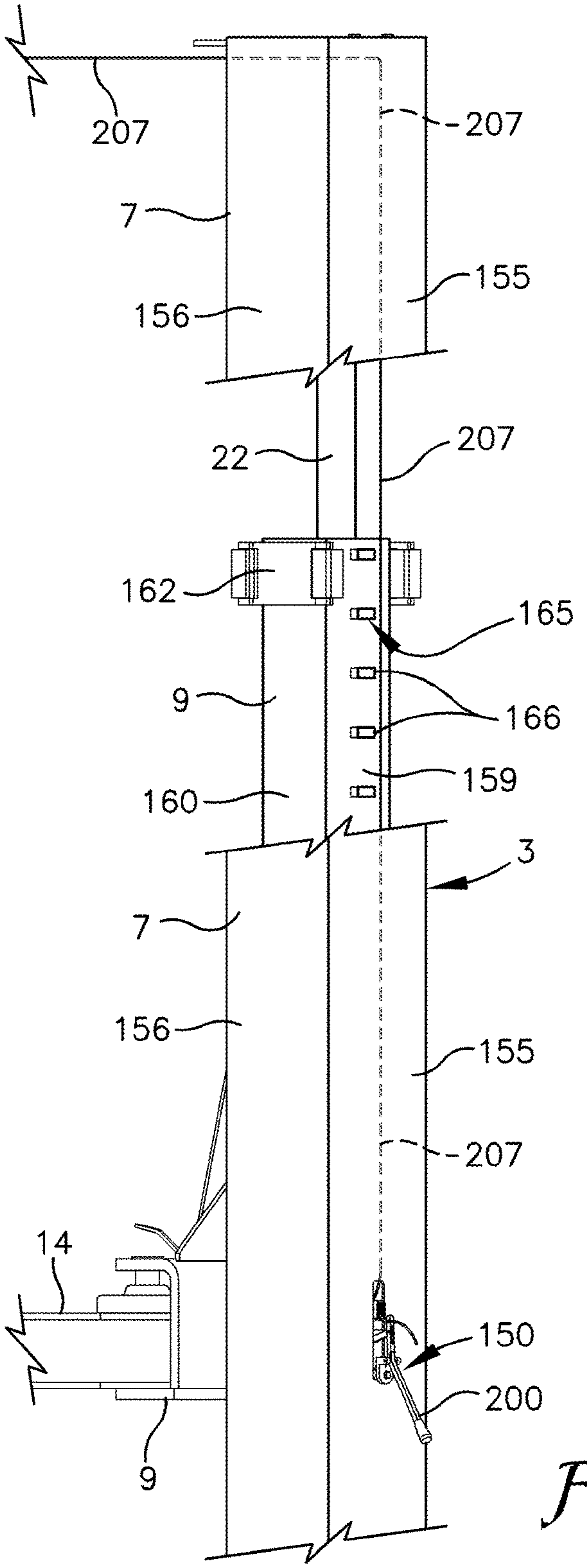
FIG. 13 is fragmentary angled elevational view of one of the lift units of the system with portions broken away to illustrates details of the lift carriage in relation to a safety latch mechanism of the present invention.

Referring to FIGS. 3 and 13, each post 7 includes an outer wall 155, side walls 156, and L-shaped front walls 157. The illustrated lift carriages 9 are rectangular tubular structures formed by end walls 159 and side walls 160. The lift carriages 9 have guide structures 162 at opposite ends thereof which form slide bearing structures as the lift carriages ride within the walls 155-157 of the posts 7 when the lift carriages 9 are raised and lowered. A ratchet track 165 is provided on the outer end wall 159 of the lift carriages 9 and includes a plurality of vertically spaced stops or stop blocks 166 positioned on or secured to the outer walls 159 of the lift carriages 9. The stop blocks 166 may be secured the outer walls 159 by welding or by the use of fasteners (not shown). Each of the stop blocks 166 has a lower abutment surface 167 (FIGS. 15 and 16) which is oriented horizontally. The stop blocks 166 are components of the safety latch mechanism 150. It is foreseen that the stops 166 could be formed in a variety of shapes or configurations and the stops 166 could, for example, comprise holes or indentations formed in the outer wall 159 of the lift carriage 9 with the portion of the outer wall 159 defining the upper edge of the hole or indentation functioning as the stop.

Figure 14:
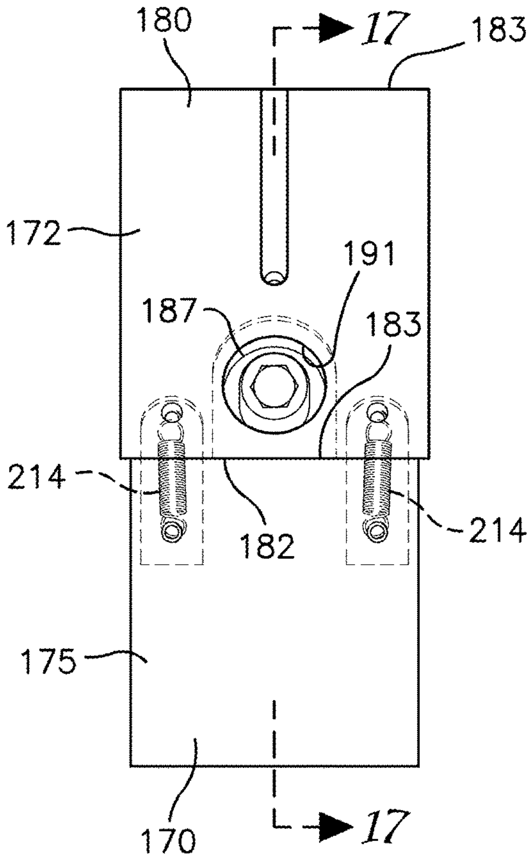
FIG. 14 is an enlarged side elevational view of a base plate and a pawl of the safety latch mechanism.
Figure 15:
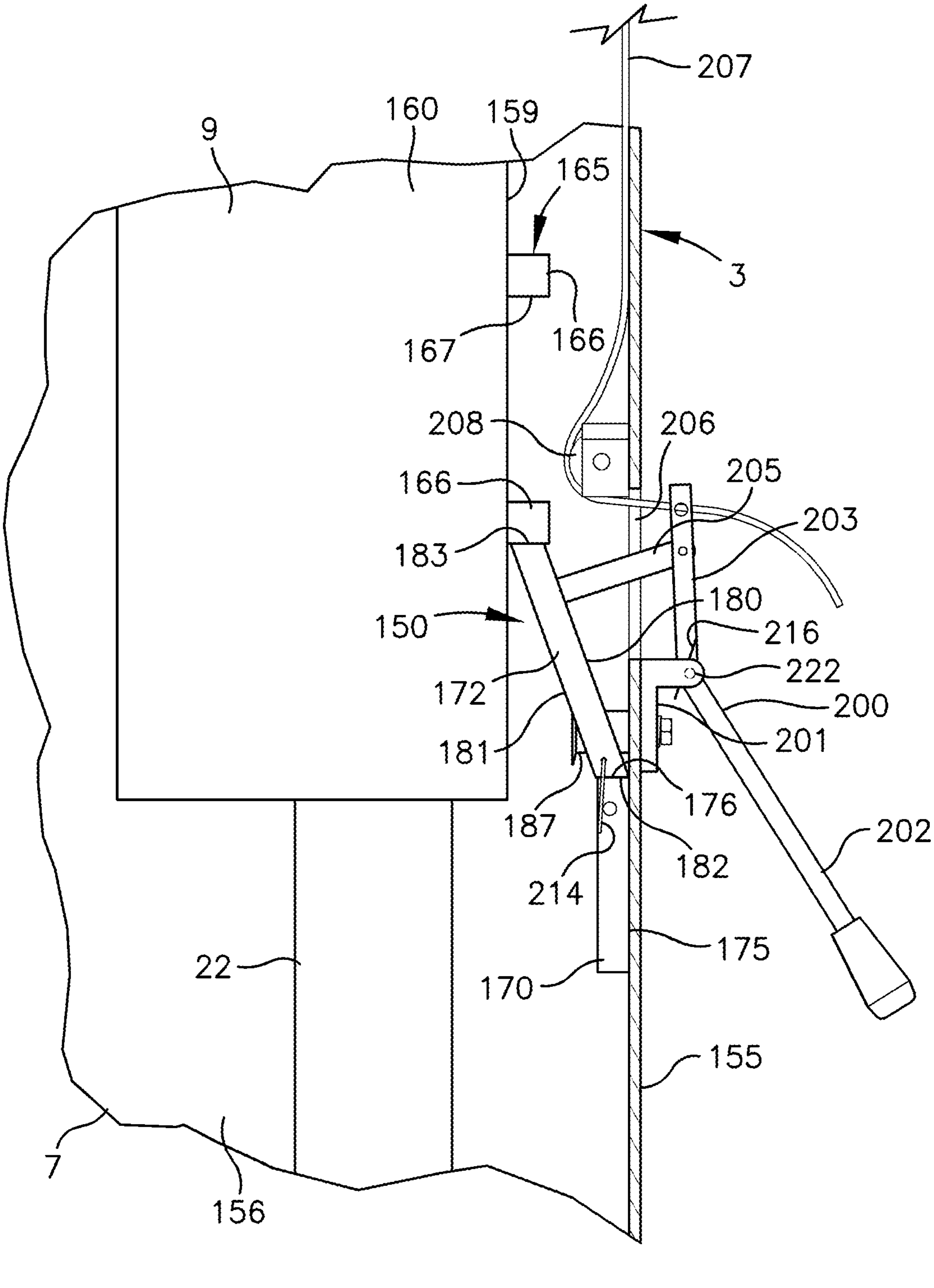
FIG. 15 is a further enlarged fragmentary front elevational view of the safety latch mechanism with a wall of the lift post removed to illustrate details of the safety latch mechanism, shown in the latched or engaged position.

Referring to FIGS. 14 and 15, the illustrated safety latch mechanism 150 of each post 7 includes a stationary base plate, pawl support member or pawl support 170 which cooperates with a movable pawl or pawl plate 172 and the stop blocks 166 to prevent unintended lowering of the carriages 9 while enabling unrestricted upward movement of the carriages 9. The pawl support 170 is illustrated as a rectangular plate having a mounting face 175 and an upper latch support surface 176. The illustrated pawl 172 has a vertical cross section shaped as a parallelogram and is formed by an outer face 180 facing the outer wall 155 of the post 7, an inner face 181 facing the lift carriage 9, a lower end surface 182, and an upper end block surface or upper block surface 183. The pawl 172 is supported on or rests on the pawl support 170.

The pawl support 170 is secured to a vertical inner surface of the outer wall 155 of the post 7, in lateral alignment with the ratchet track 165 on the lift carriage 9 and at such a vertical location as to position the pawl 172 to selectively engage each of the stop blocks 166 of the ratchet track 165 through the full extension and retraction of the lift carriage 9 relative to the post 7. The pawl support 170 may be secured to the post wall 155 by welding or by the use of fasteners (not shown). The pawl support 170 is oriented such that the upper support surface 176 is oriented horizontally.

Figure 16:
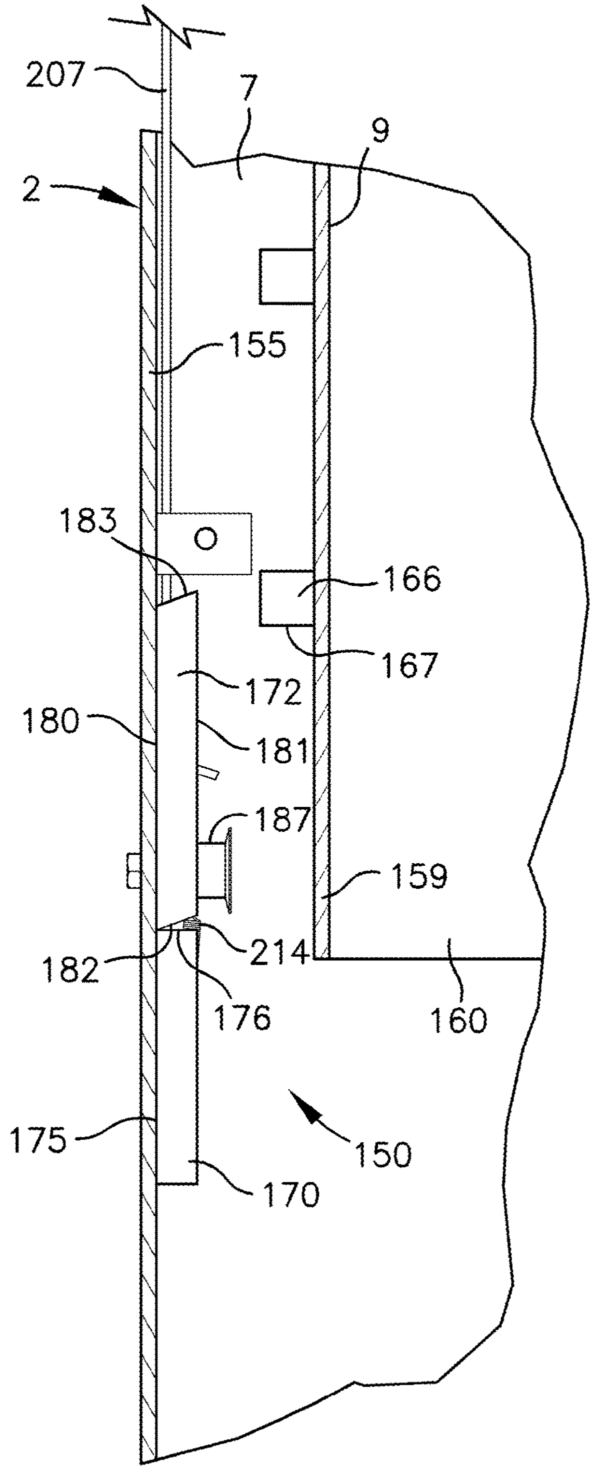
FIG. 16 is a further enlarged fragmentary front elevational view of the safety latch mechanism of the lift post opposite that illustrated in FIGS. 13-15, and illustrates a pawl thereof in a released position thereof.
Figure 17:
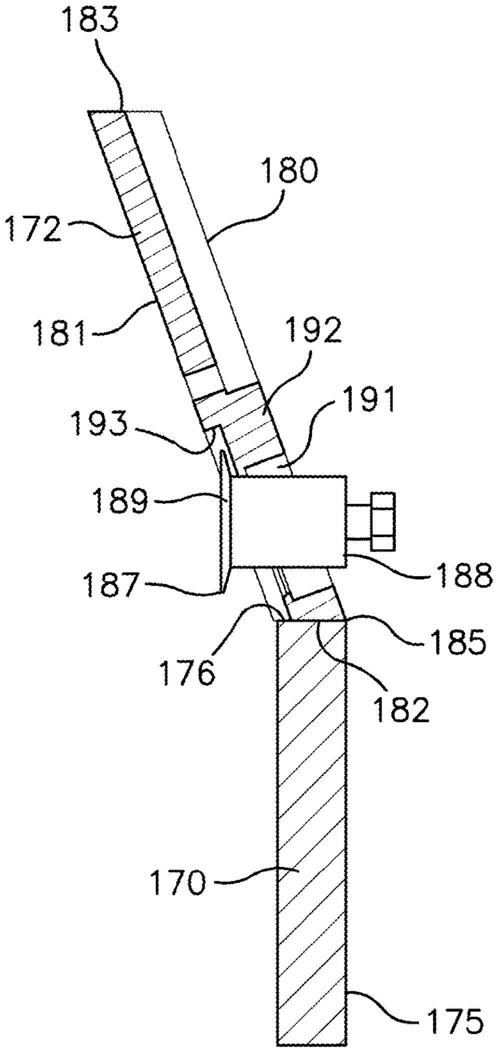
FIG. 17 is a greatly enlarged cross sectional view taken on line 17-17 of FIG. 14 and illustrates additional details of the base plate and pawl of the latch safety mechanism.

As shown in FIGS. 15-17, the lower end surface 182 of the illustrated pawl 172 is oriented at an acute angle to the outer face 180 thereof. Similarly, the upper end block surface 183 is oriented at an acute angle to the inner face 181 of the pawl 172. Thus, a side profile of the pawl 172 has a parallelogram shape. The pawl 172 is configured in such a manner that in a latched or engaged position, as shown in FIGS. 15 and 17, the lower end surface 182 and the upper block surface 183 are oriented horizontally. By this means, the surfaces 182 and 183 of the pawl 172 make solid contact respectively with the horizontally oriented lower surfaces 167 of the stop blocks 166 and the upper support surface 176 of the pawl support 170 in the engaged position thereof and form a positive stop to downward movement of the lift carriage 9.

In movement of the pawl 172 between the engaged position shown in FIGS. 15 and 17 and the released position shown in FIG. 16, the pawl 172 pivots about a pivot line, corner, or edge 185 (see FIG. 17) formed by intersection of the outer face 180 of the pawl 172 and the lower end surface 182 thereof. In the fully released position shown in FIG. 16, the lower surface 182 is angled away from the upper support surface 176 of the pawl support 170. Pivoting the pawl 172 about the pivot edge 185 eliminates the need for additional pivot structure, such as a pivot pin or the like, although it is foreseen that the pawl 172 could be adapted to incorporate such pivot structure. Movement of the pawl 172 between the engaged position and the released position is constrained by a guide member 187 secured to the outer wall 155 of each of the posts 7. The illustrated guide member 187 has a narrower cylindrical outer section 188 and a wider conical inner section 189. The narrower section 188 extends through an opening 191 formed in a pawl wall 192 adjacent a recess 193 formed into the inner face 181 of the pawl 172. Contact of the wall 192 with the wider section 189 limits inward pivoting of the pawl 172.

Figure 18:
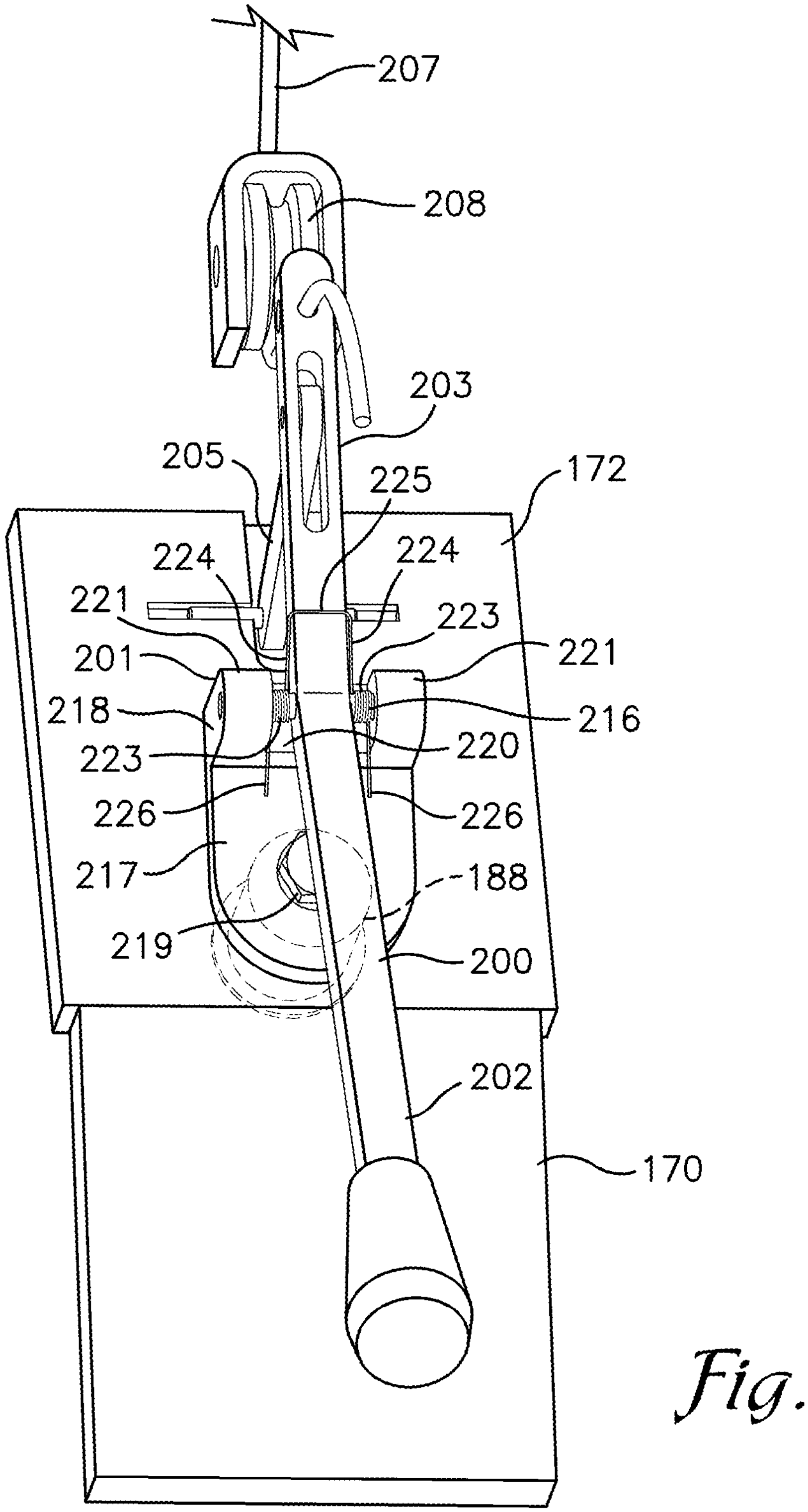
FIG. 18 is a fragmentary perspective view of a release handle of safety latch mechanism and illustrates a spring engaged between the release handle and a mounting bracket of the handle to urge the release handle and pawl toward the engaged position.

In order for the lift carriage 9 to be lowered, the pawls 172 on both lift units 2 and 3 of the lift system 1 must be retracted from the engaged position shown in FIGS. 15 and 17 to the released position shown in FIG. 16. Referring to FIGS. 15 and 18, a pawl release member or lever 200 is pivotally connected to an inverted L-shaped release lever or handle bracket 201 secured on an outer surface of the outer wall 155 of the post 7 of one of the lift units, such as lift unit 3. The release lever or handle 200 includes a handle section 202 and a crank section 203. The illustrated release lever 200 is connected to the pawl 172 by a release link 205 pivotally connected to the pawl 172 and the crank section 203 of the release lever 200. The release link 205 extends through an opening 206 formed through the outer wall 155 of the post 7. The release lever 200 enables selective manual retraction of the pawl plate 172 from the engaged position to the released position to enable lowering of the carriages 9 by control of the lift cylinders 22.

In the illustrated safety latch mechanism 150, the pawl 172 of the lift unit 2 (FIG. 16) is connected to the crank section 203 of the release lever 200 in the lift unit 3 by a cable 207. The cable 207 is routed from the release lever crank section 203 through the opening 206 of the wall 155 of the post 7 to the pawl 172 of the lift unit 2 by sheaves or pulleys 208 (FIGS. 15 and 18) spaced along the posts 7 of the lift units 3 and 2. The cable 207 is supported between the lift units 2 and 3 by an elongated trough assembly 210 (FIG. 1) extending between upper ends of the lift units 2 and 3. The trough assembly 210 may also be used to route hydraulic conduits (not shown) between hydraulic controls (not shown) and the hydraulic cylinders 22 of the lift units 2 and 3. Thus, pivoting of the release lever 200 on the lift unit 3 toward the released position pivots the pawls 172 of both lift units 3 and 2 toward the released position. It is foreseen that the lift system 1 could alternatively be provided with a dual set of hydraulic controls (not shown) and release levers 200 on both lift units 2 and 3.

The illustrated pawls 172 are normally urged toward the engaged position by gravity. The safety latch mechanism 150 may be provided with springs 214 (FIG. 15) engaged between the base plates 170 and the pawls 172 to resiliently urge the pawls toward the engaged position. The springs 214 may be coiled tension springs as shown in FIG. 14, torsion springs as shown in FIG. 15, or the like. During upward movement of the lift carriages 9, the pawls 172 are angularly deflected by contact of the stop blocks 166 with the inner faces 181 of the pawls 172 and, thus, do not interfere with upward movement of the carriages 9. When upward movement of the lift carriage 9 is stopped, the pawls 172 will be advanced by a combination of gravity and the biasing force of the springs 214 to the engaged position with upper block surfaces 183 thereof located at random positions between two adjacent stop blocks 166. The block surfaces 183 will be in position to contact the lower abutment surfaces 167 of the stop blocks 166 should the lift carriages 9 descend, as by leakage of pressurized fluid from the cylinders 22, an accidentally activated hydraulic control, or the like. Any further descent or downward movement of the lift carriages 9 will be prevented by engagement of the stop blocks 166 with the pawls 172. If the lift carriages 9 have the stop blocks 166 in contact with the pawls 172, it may be necessary to lift the carriages 9 a short distance to enable the release levers 200 to pivot the pawls 172 to the release position. Thereafter, the cylinders 22 can be controlled to lower the lift carriages 9 as needed.

Referring to FIGS. 15 and 18, the illustrated L-shaped bracket 201 may include a release lever spring 216 engaged between the release lever 200 and the bracket 201 and urging the release lever 200 toward the engaged position. The L-shaped bracket 201 may include a vertically oriented mounting leg 217 and an outwardly extending pivot leg 218. The mounting leg 217 is secured to the outer wall 155 of the support post 7, as by a bolt 219 extending through the wall 155 into the narrow section 188 of the guide member 187. The pivot leg 218 has a rectangular notch 220 formed therein to form a pair of pivot mounting ears 221. The release lever 200 is pivotally mounted to the ears 221 within the notch 220 on a pivot pin 222 (FIG. 15) extending between the mounting ears 221. The illustrated release lever spring 216 is a U-shaped torsion spring having a pair of torsion coils 223 sleeved onto the pivot pin 222 between the mounting ears 221 and opposite sides of the release lever 200. Upper legs 224 of the spring 216 are connected by a cross-over link 225 which engages the crank section 203 of the release lever 200. Lower legs 226 of the spring 216 engage an outer surface of the bracket 201. The release lever spring 216 is tensioned so that it resiliently urges the release lever 200 toward the engaged position thereof and, if provided, in cooperation with the springs 214 engaged between the base plates 170 and the pawls 172.

It is to be understood that while certain forms of the present invention have been illustrated and described herein, it is not to be limited to the specific forms or arrangement of parts described and shown.

What is claimed as new and desired to be secured by Letters Patent is:

1. A safety latch mechanism for a lift unit including an upstanding support post and a lift carriage slidably engaging and movable along the post, the mechanism comprising:

(a) a plurality of stops positioned in vertically spaced relation along a surface of the lift carriage of a lift unit;

(b) a latch support surface positioned on the support post of a lift unit;

(c) a pawl resting on the latch support surface;

(d) the pawl being movable between an engaged position to contact one of the plurality of stops in such a manner as to prevent downward movement of the lift carriage and a released position out of engagement with said one of the plurality of stops, the pawl normally being urged toward the engaged position;

(e) the pawl including:

(1) an outer face facing the support post;

(2) a lower end surface oriented at an acute angle relative to the outer face and forming a pivot edge therebetween, the pivot edge engaging an upper surface of the latch support surface; and (3) the pawl pivoting about the pivot edge between the engaged and released positions; and (f) a release member operably connected to the pawl to enable manual retraction of the pawl from the engaged position to the released position to thereby enable lowering of the lift carriage.

2. The safety latch mechanism as set forth in claim 1 wherein:

(a) the pawl is urged toward the engaged position by gravity.

3. The safety latch mechanism as set forth in claim 1 wherein:

(a) the pawl is resiliently urged toward the engaged position by a spring engaging the pawl and supported by the support post.

4. The safety latch mechanism as set forth in claim 1 wherein the pawl is urged toward the engaged position by:

(a) a combination of gravity and a spring engaging the pawl and supported by the support post.

5. The safety latch mechanism as set forth in claim 1 wherein the pawl includes:

(a) an inner face facing the lift carriage; and (b) an upper end surface oriented at an acute angle relative to the inner face.

6. The safety latch mechanism as set forth in claim 1 wherein a vertical cross section of the pawl is substantially a parallelogram.

7. A safety latch mechanism for a lift unit including an upstanding support post and a lift carriage slidably engaging and movable along the post, the mechanism comprising:

(a) a plurality of stop blocks secured in vertically spaced relation along a surface of the lift carriage of the lift unit;

(b) a pawl support secured to a post surface of the support post of the lift unit;

(c) a pawl resting on the pawl support;

(d) the pawl being movable between an engaged position engaging one of the plurality of stop blocks to prevent downward movement of the lift carriage and a released position out of engagement with said one of the plurality of stop blocks, the pawl normally being urged toward the engaged position;

(e) the pawl including:

(1) an outer face facing the support post;

(2) a lower end surface oriented at an acute angle relative to the outer face and forming a pivot edge therebetween, the pivot edge engaging an upper surface of the pawl support; and (3) the pawl pivoting about the pivot edge between the engaged and released positions; and (f) a release handle pivotally mounted on the support post and operably connected to the pawl to enable manual retraction of the pawl from the engaged position to the released position to thereby enable lowering of the lift carriage.

8. The safety latch mechanism as set forth in claim 7 wherein:

(a) the pawl is urged toward the engaged position by gravity.

9. The safety latch mechanism as set forth in claim 7 wherein:

(a) the pawl is resiliently urged toward the engaged position by a spring operably engaged between the pawl support and the pawl.

10. The safety latch mechanism as set forth in claim 7 and including:

(a) the release handle is pivotally mounted on the support post by a release handle bracket secured to the support post; and (b) the pawl is resiliently urged toward the engaged position by a spring engaged between the release handle bracket and the release handle.

11. The safety latch mechanism as set forth in claim 7 wherein the pawl is urged toward the engaged position by:

(a) a combination of gravity and a spring engaged between the pawl support and the pawl.

12. The safety latch mechanism as set forth in claim 7 wherein:

(a) the release handle is connected to the pawl by a release link connected between the release handle and the pawl.

13. The safety latch mechanism as set forth in claim 7 wherein:

(a) the release handle is connected to the pawl by a cable connected between the release handle and the pawl.

14. The safety latch mechanism as set forth in claim 7 and including:

(a) a guide member secured to the support post and extending through the pawl to guide movement of the pawl between the engaged position and the released position.

15. A safety latch mechanism for a lift unit including an upstanding support post and a lift carriage slidably engaging and movable along the post, the mechanism comprising:

(a) a plurality of stop blocks secured in vertically spaced relation along a surface of the lift carriage of the lift unit;

(b) a pawl support secured to a post surface of the support post of the lift unit;

(c) a pawl resting on the pawl support; and (d) the pawl being movable between an engaged position engaging one of the plurality of stop blocks to prevent downward movement of the lift carriage and a released position out of engagement with said one of the plurality of stop blocks, the pawl normally being urged toward the engaged position;

(e) the pawl including:

(1) an outer face facing the support post;

(2) a lower end surface oriented at an acute angle relative to the outer face;

(3) an inner face facing the lift carriage;

(4) an upper end surface oriented at an acute angle relative to the inner face; and (5) the inner and outer faces and upper and lower end surfaces cooperating such that a vertical cross section of the pawl is substantially a parallelogram; and (f) a release handle pivotally mounted on the support post and operably connected to the pawl to enable manual retraction of the pawl from the engaged position to the released position to thereby enable lowering of the lift carriage.

16. A safety latch mechanism for a lift unit including an upstanding support post and a lift carriage slidably engaging and movable along the post, the mechanism comprising:

(a) a plurality of stop blocks secured in vertically spaced relation along a surface of a lift carriage of a lift unit, each of the stop blocks having a lower stop surface;

(b) a pawl support member secured to a post surface of the support post of the lift unit, the pawl support member having an upper support surface;

(c) a pawl having a lower end surface engaging the upper support surface of the pawl support member and an upper block surface opposite the lower end surface;

(d) the pawl being movable between an engaged position in which the upper block surface will engage the lower stop surface of a stop block to prevent downward movement of the lift carriage and a released position in which the upper block surface is out of engagement with the lower stop surface of the stop block, the pawl normally being urged toward the engaged position; and (e) the pawl including:

(1) an outer face facing the support post;

(2) an inner face facing the lift carriage;

(3) the lower end surface being oriented at an acute angle relative to the outer face;

(4) the upper block surface being oriented at an acute angle relative to the inner face; and (5) the inner and outer faces, upper block surface, and the lower end surface cooperating such that a vertical cross section of the pawl is substantially a parallelogram and;

(f) a release handle pivotally mounted on a surface of the support post and operably connected to the pawl in such a manner as to enable manual retraction of the pawl from the engaged position to the released position to thereby enable lowering of the lift carriage.

17. A safety latch mechanism for a lift unit including an upstanding support post and a lift carriage slidably engaging and movable along the post, the mechanism comprising:

(a) a plurality of stop blocks secured in vertically spaced relation along a surface of a lift carriage of a lift unit, each of the stop blocks having a lower stop surface;

(b) a pawl support member secured to a post surface of the support post of the lift unit, the pawl support member having an upper support surface;

(c) a pawl having a lower end surface engaging the upper support surface of the pawl support member and an upper block surface opposite the lower end surface;

(d) the pawl being movable between an engaged position in which the upper block surface will engage the lower stop surface of a stop block to prevent downward movement of the lift carriage and a released position in which the upper block surface is out of engagement with the lower stop surface of the stop block, the pawl normally being urged toward the engaged position;

(e) the pawl including:

(1) the upper support surface of the pawl support member being oriented horizontally;

(2) the pawl having a lower end surface oriented at an acute angle relative to an inner face of the pawl and an upper block surface oriented at an acute angle relative to an outer face of the pawl; and (3) the lower end surface and the upper block surface of the pawl being configured in such a manner that the upper block surface and the lower end surface thereof are both oriented horizontally when the pawl is in the engaged position; and (f) a release handle pivotally mounted on a surface of the support post and operably connected to the pawl in such a manner as to enable manual retraction of the pawl from the engaged position to the released position to thereby enable lowering of the lift carriage.

18. A safety latch mechanism for a lift unit including an upstanding support post and a lift carriage slidably engaging and movable along the post, the mechanism comprising:

(a) a plurality of stop blocks secured in vertically spaced relation along a surface of a lift carriage of a lift unit, each of the stop blocks having a lower stop surface;

(b) a pawl support member secured to a post surface of the support post of the lift unit, the pawl support member having an upper support surface;

(c) a pawl having a lower end surface engaging the upper support surface of the pawl support member and an upper block surface opposite the lower end surface;

(d) the pawl being movable between an engaged position in which the upper block surface will engage the lower stop surface of a stop block to prevent downward movement of the lift carriage and a released position in which the upper block surface is out of engagement with the lower stop surface of the stop block, the pawl normally being urged toward the engaged position;

(e) the pawl including:

(1) an outer face facing the support post;

(2) the lower end surface being oriented at an acute angle relative to the outer face and forming a pivot edge therebetween, the pivot edge engaging the upper support surface of the pawl support member; and (3) the pawl pivoting about the pivot edge between the engaged and released positions; and (f) a release handle pivotally mounted on a surface of the support post and operably connected to the pawl in such a manner as to enable manual retraction of the pawl from the engaged position to the released position to thereby enable lowering of the lift carriage.

19. The safety latch mechanism as set forth in claim 18 wherein the pawl is urged toward the engaged position by:

(a) a combination of gravity and a spring engaged between the pawl support member and the pawl.

20. The safety latch mechanism as set forth in claim 18 wherein:

(a) the release handle is connected to the pawl by a release link connected between the release handle and the pawl.

21. The safety latch mechanism as set forth in claim 18 wherein:

(a) the release handle is connected to the pawl by a cable connected between the release handle and the pawl.

22. The safety latch mechanism as set forth in claim 18 and including:

(a) a guide member secured to the support post and extending through the pawl to guide movement of the pawl between the engaged position and the released position.

23. The safety latch mechanism as set forth in claim 18 wherein the lower stop surface of each stop block is oriented horizontally and wherein:

(a) the lower end surface of the pawl extends horizontally; and (b) the upper block surface of the pawl support member extends horizontally.

* * * * *